US012806849B2

(12) United States Patent
Tang et al.

(10) Patent No.: US 12,806,849 B2
(45) Date of Patent: Nov. 24, 2026

(54) FILM-COATING DEVICE

(71) Applicant: Wuxi Lead Intelligent Equipment Co., Ltd., Wuxi (CN)

(72) Inventors: Xiaolong Tang, Jiangsu (CN); Yizhou Sun, Jiangsu (CN)

(73) Assignee: Wuxi Lead Intelligent Equipment Co., Ltd., Wuxi (CN)

( * ) Notice: Subject to any disclaimer, the term of this patent is extended or adjusted under 35 U.S.C. 154(b) by 140 days.

(21) Appl. No.: 18/854,153

(22) PCT Filed: Feb. 27, 2023

(86) PCT No.: PCT/CN2023/078513

§ 371 (c)(1),
(2) Date: Oct. 4, 2024

(87) PCT Pub. No.: WO2023/193541

PCT Pub. Date: Oct. 12, 2023

(65) Prior Publication Data

US 2026/0166805 A1 Jun. 18, 2026

(30) Foreign Application Priority Data

Apr. 8, 2022 (CN) ........................ 202220819746.5

(51) Int. Cl.
*B29C 63/04* (2006.01)
*H01M 10/04* (2006.01)
*B29L 31/34* (2006.01)

(52) U.S. Cl.
CPC ......... *B29C 63/04* (2013.01); *H01M 10/0404* (2013.01); *B29L 2031/3468* (2013.01)

(58) Field of Classification Search
CPC .. B29C 63/04; B29C 66/343; H01M 10/0404; H01M 6/005; H01M 50/586; H01M 50/595; H01M 50/489; H01M 50/474; B29L 2031/3468; Y10T 156/1028; Y10T 156/103
USPC ...................... 156/212, 213, 475, 477.1, 492
See application file for complete search history.

(56) References Cited

U.S. PATENT DOCUMENTS

2023/0282870 A1* 9/2023 Zheng ............... H01M 10/0404
427/58

FOREIGN PATENT DOCUMENTS

CN 109065938 A * 12/2018 .......... H01M 50/572
KR 101903367 B1 * 10/2018 ........ H01M 10/0404

* cited by examiner

*Primary Examiner* — John L Goff, II
(74) *Attorney, Agent, or Firm* — Baker Botts LLP

(57) ABSTRACT

Disclosed is a film-coating device, comprising: a bearing mechanism; a film-coating mechanism comprising a driving assembly and a film-adsorbing assembly, the film-adsorbing assembly comprising a mounting seat, a first adsorbing plate, a second adsorbing plate and a third adsorbing plate; a smoothing mechanism; the driving assembly may lead the second adsorbing plate to abut against the upper end surface of the product in the process of driving the mounting seat to descend; when the second adsorbing plate abuts against the upper end surface of the product, the first adsorbing plate and the third adsorbing plate may rotate relative to the mounting seat to respectively abut against side surfaces of the product in the first horizontal direction.

11 Claims, 5 Drawing Sheets

FILM-COATING DEVICE

CROSS-REFERENCE TO RELATED APPLICATIONS

The present disclosure is a National Stage of International Application No. PCT/CN2023/078513, filed on Feb. 27, 2023, which claims priority to Chinese Patent Application No. 202220819746.5, filed on Apr. 8, 2022, both of which are hereby incorporated by reference in their entireties.

TECHNICAL FIELD

The present disclosure relates to the field of battery manufacturing devices, and particularly to a film-coating device.

BACKGROUND

In lithium battery production lines, the quality requirements for the battery are demanding. In order to protect the insulation between a cell and an aluminum shell, it is necessary to coat the surface of the cell with an insulating film (e.g. Mylar film) so as to provide an insulation effect.

SUMMARY

Technical Problem

Since a bottom surface of the cell is soft, when performing film-coating on the bottom surface of the cell, the bottom surface of the cell is prone to wrinkles under pressure, resulting in failure of the cell and negatively affects precision of the film-coating.

Solution

Based on the above, in view of the prior art problem of unqualified cells and unprecise film-coating caused by vulnerability of the cell bottom-surface to wrinkles under pressure during film-coating, it is necessary to provide a film-coating device for addressing the above defect.

A film-coating device, comprising: a bearing mechanism configured for bearing a product to be coated with a film; a film-coating mechanism comprising a driving assembly and a film-adsorbing assembly, the film-adsorbing assembly comprising a mounting seat, a first adsorbing plate, a second adsorbing plate and a third adsorbing plate; the mounting seat is mounted on a driving end of the driving assembly and is located above the bearing mechanism; the first adsorbing plate, the second adsorbing plate and the third adsorbing plate are provided in sequence along a first horizontal direction on one side of the mounting seat facing toward the bearing mechanism, and are used for jointly adsorbing a film material; and a smoothing mechanism comprising two smoothing assemblies respectively provided on two sides of the bearing mechanism in the first horizontal direction, each of the smoothing assemblies comprising a flexible smoothing piece, and the flexible smoothing piece of each of the smoothing assemblies being configured to be inserted in a controlled way into a junction between a side surface and an upper end surface of the product and to perform smoothing; wherein the driving assembly is used for driving the mounting seat to ascend and descend, and the mounting seat is capable of driving the second adsorbing plate to abut against the upper end surface of the product in the process of descending; when the second adsorbing plate abuts against the upper end surface of the product, the first adsorbing plate and the third adsorbing plate are capable of rotating relative to the mounting seat to respectively abut against side surfaces of the product in the first horizontal direction.

In one of the embodiments, the film-adsorbing assembly has a first state and a second state; when the film-adsorbing assembly is in the first state, both the first adsorbing plate and the third adsorbing plate are parallel to the second adsorbing plate, and the first adsorbing plate, the second adsorbing plate and the third adsorbing plate are in the same horizontal plane; when the film-adsorbing assembly is in the second state, one end of each of the first adsorbing plate and the third adsorbing plate distal to the second adsorbing plate, is turned toward the bearing mechanism to be perpendicular to the second adsorbing plate.

In one of the embodiments, the bearing mechanism comprises a bearing frame, a positioning base and two clamping assemblies; the positioning base is provided on the bearing frame and is used for bearing the product; the two clamping assemblies are both provided on the bearing frame and are respectively located on two sides of the positioning base in a second horizontal direction perpendicular to the first horizontal direction; the two clamping assemblies are configured for moving in a controlled way close to or away from each other so as to clamp or release the product.

In one of the embodiments, the film-adsorbing assembly further comprises an elevation seat and a first rotating actuator, the elevation seat is connected to a driving end of the driving assembly, the mounting seat is connected onto the elevation seat in a manner that allows it to rotate on a first rotation axis, and the first rotating actuator is provided on the elevation seat and is in driving connection with the mounting seat; wherein the first rotation axis is parallel to the vertical direction.

In one of the embodiments, the film-adsorbing assembly further comprises a first rotating shaft and a second rotating actuator, the first rotating shaft is rotatably connected onto the mounting seat, and the second rotating actuator is provided on the mounting seat and is in driving connection with the first rotating shaft; one end of the first adsorbing plate proximate to the second adsorbing plate is connected onto the first rotating shaft, an axial direction of the first rotating shaft is parallel to a second horizontal direction, and the second horizontal direction is perpendicular to the first horizontal direction.

In one of the embodiments, the film-adsorbing assembly further comprises a second rotating shaft and a third rotating actuator, the second rotating shaft is rotatably connected onto the mounting seat, and the third rotating actuator is provided on the mounting seat and is in driving connection with the second rotating shaft; one end of the third adsorbing plate proximate to the second adsorbing plate is connected onto the second rotating shaft, an axial direction of the second rotating shaft is parallel to a second horizontal direction, and the second horizontal direction is perpendicular to the first horizontal direction In one of the embodiments, each smoothing assembly comprises a fixed seat and a movable seat, the movable seat is provided on the fixed seat, and the flexible smoothing piece is mounted on the movable seat; wherein the movable seat is configured to move relative to the fixed seat in a controlled way along a preset direction, so as to lead the flexible smoothing piece to be inserted into or withdrawn from the junction between the side surface and the upper end surface of the product.

In one of the embodiments, the preset direction intersects with the first horizontal direction and the vertical direction.

In one of the embodiments, the film-coating device further comprises a welding mechanism, the welding mechanism comprises two welding assemblies respectively arranged on two sides of the bearing mechanism in the first horizontal direction, and each welding assembly is configured for welding the film material to the side surface of the product.

In one of the embodiments, each welding assembly comprises a fixed frame, a baseplate and a welding head, the baseplate is provided on the fixed frame and is configured to move relative to the fixed frame in a controlled manner along the first horizontal direction, and the welding head is mounted on the baseplate.

In one of the embodiments, each welding assembly comprises three welding heads, which are respectively a first welding head, a second welding head and a third welding head arranged at intervals along a second horizontal direction perpendicular to the first horizontal direction; wherein the first welding head and the third welding head are adjustable in their positions relative to the baseplate in the second horizontal direction.

Beneficial Effect

Regarding the above film-coating device, in the actual film-coating operation, the cell to be coated with a film is positioned on the bearing mechanism. The driving assembly drives the mounting seat to descend until the mounting seat leads the second adsorbing plate to descend to abut against the upper end surface of the cell on the bearing mechanism, so as to adhere the film material adsorbed by the second adsorbing plate to the upper end surface of the cell. Then, the first adsorbing plate and the third adsorbing plate are controlled to rotate toward two sides of the cell in the first horizontal direction respectively and stop after rotated by a certain angle (for example, 30°). At this time, the two flexible smoothing pieces of the smoothing assembly are controlled to insert into the junction between the side surfaces of the cell in the first horizontal direction and the upper end surface of the cell, and smooth the surface of the cell and the film material, so as to prevent the surface of the cell and the film material from wrinkling. After smoothing is completed, the flexible smoothing pieces of the two smoothing assemblies are controlled to return to the initial position. And then, the first adsorbing plate and the third adsorbing plate are controlled to continue rotating toward two sides of the cell in the first horizontal direction respectively until abutting against two side surfaces of the cell in the first horizontal direction respectively, such that the film material adsorbed on the first adsorbing plate and the third adsorbing plate is attached to two side surfaces of the cell in the first horizontal direction. Finally, the first adsorbing plate, the second adsorbing plate, and the third adsorbing plate release the adsorption of the film material, the first adsorbing plate and the third adsorbing plate are rotated in reverse to the initial position (at this time, the film material is separated from the first adsorbing plate and the third adsorbing plate, and remains attached to the side surface of the cell), and the driving assembly drives the mounting seat to ascend and leads the first adsorbing plate, the second adsorbing plate and the third adsorbing plate to ascend (at this time, the film material is separated from the second adsorbing plate and remains attached to the upper end surface of the cell). In this way, in the film-coating device of the present disclosure, after the film material is attached to the upper end surface of the cell, the two smoothing assemblies of the smoothing mechanism are used to smooth the junction between the side surfaces and the upper end surface of the cell (that is, the junction between the film material and the upper end surface of the cell), and after smoothing, the first adsorbing plate and the third adsorbing plate are used to coat the two side surfaces of the cell with a film, so as to avoid the upper end surface of the cell from wrinkling and to be beneficial to ensuring the quality and the film-coating precision of the cell.

DETAILED DESCRIPTION

Figure 1:
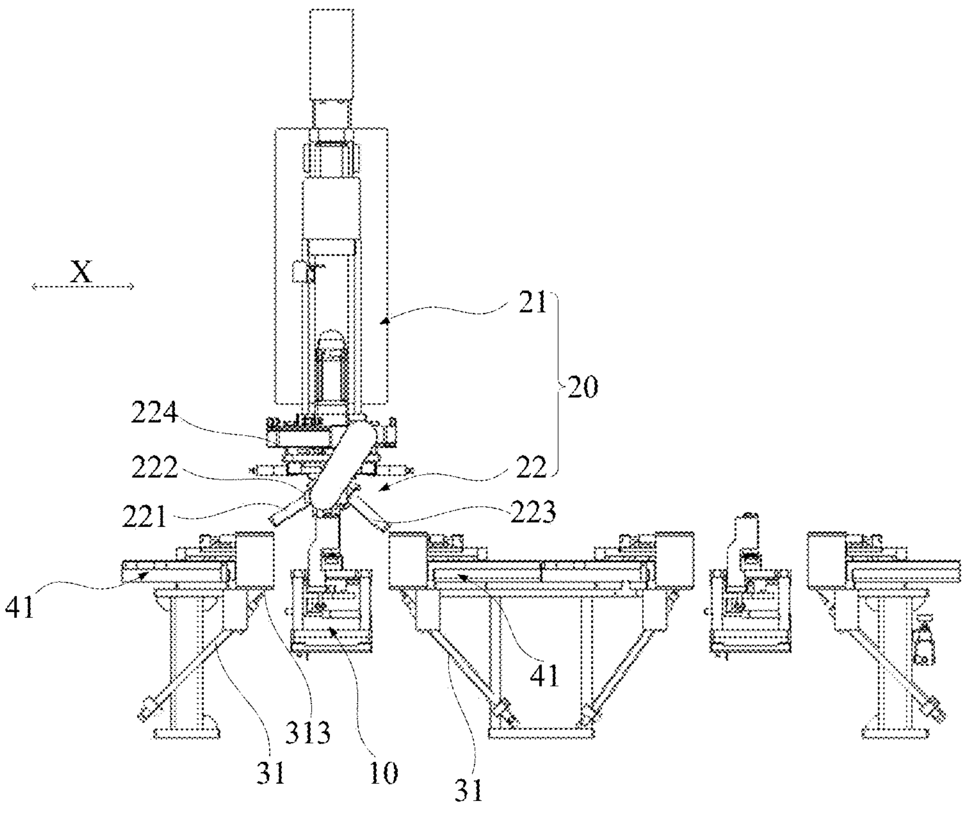
FIG. 1 shows a structural schematic diagram of a film-coating device in an embodiment of the present disclosure.

In order to make the above objects, features and advantages of the present disclosure more clearly understood, specific embodiments of the present disclosure will be described in detail below with reference to the accompanying drawings. In a following description, numerous specific details are set forth in order to provide a thorough understanding of the present disclosure. However, the present disclosure can be implemented in many other ways different from those described here, and those skilled in the art can make similar improvements without violating a connotation of the present disclosure. Therefore, the present disclosure is not limited by the specific embodiments disclosed below.

In the description of the present disclosure, it should be understood that, an orientation or positional relationship indicated by terms “center”, “longitudinal”, “lateral”, “length”, “width”, “thickness”, “upper”, “lower”, “front”, “back”, “left”, “right”, “vertical”, “horizontal”, “top”, “bottom”, inner”, “outer”, “clockwise”, “counterclockwise”, “axial”, “radial”, “circumferential” is based on the orientation or positional relationship shown in the accompanying drawings, and is only for convenience of describing the present disclosure and simplifying the description, rather than indicating or implying that a device or element referred to must be provided with a particular orientation, be constructed and operate in a particular orientation, and therefore should not be understood as a limitation to the present disclosure.

In addition, terms “first” and “second” are only used for descriptive purposes and should not be understood as indicating or implying relative importance or implying a number of indicated technical features. Therefore, a feature delimited with “first”, “second” may expressly or implicitly include at least one of those features. In a description of the present disclosure, "a plurality" means at least two, such as two, three, etc., unless expressly and specifically defined otherwise.

In the present disclosure, unless expressly specified and limited otherwise, terms "installed", "communicated", "connected", "fixed" and other terms should be interpreted in a broad sense, for example, it can be a fixed connection, a detachable connection, or an integrated; it can be a mechanical connection or an electrical connection; it can be directly connected, or indirectly connected through an intermediate medium, and it can be an internal communication between two elements or an interaction relationship between the two elements, unless otherwise explicitly defined. For those of ordinary skill in the art, specific meanings of the above terms in the present disclosure can be understood according to specific situations.

In the present disclosure, unless expressly stated and defined otherwise, a first feature "on" or "under" a second feature may be that the first feature is in direct contact with the second feature, or the first feature and the second feature are indirectly contacted through an intermediary. In addition, the first feature being "above", "over" and "on" the second feature may mean that the first feature is directly above or obliquely above the second feature, or simply means that the first feature is higher than the second feature in a horizontal direction. The first feature being "below", "under" and "below" the second feature may mean that the first feature is directly below or obliquely below the second feature, or simply means that the first feature is smaller than the second feature in a horizontal direction.

It should be noted that when an element is referred to as being "fixed to" or "arranged on" another element, it can be directly on another element, or there may be an intervening element therebetween. When an element is referred to as being "connected" to another element, it can be directly connected to another element or intervening elements may also be present. Terms "vertical", "horizontal", "upper", "lower", "left", "right" and similar expressions used here are only for illustration purposes rather than indicating the only implementation.

Please refer to FIG. 1, an embodiment of the present disclosure provides a film-coating device for coating a film to a product to be coated with a film. The product may be a cell A, and of course, it may also be other products that require a film to be coated with, which is not limited herein. For the sake of description, the core A is taken as an example for explanation herein.

The film-coating device comprises a bearing mechanism 10, a film-coating mechanism 20, and a smoothing mechanism (not shown). The bearing mechanism 10 is configured for bearing the cell A. The film-coating mechanism 20 comprises a driving assembly 21 and a film-adsorbing assembly 22. The film-adsorbing assembly 22 comprises a mounting seat 224, a first adsorbing plate 221, a second adsorbing plate 222, and a third adsorbing plate 223. The mounting seat 224 is mounted on a driving end of the driving assembly 21 and located above the bearing mechanism 10. The driving assembly 21 is configured for driving the mounting seat 224 to ascend and descend. The first adsorbing plate 221, the second adsorbing plate 222 and the third adsorbing plate 223 are provided in sequence along a first horizontal direction X on one side of the mounting seat 224 facing toward the bearing mechanism 10, and are used for jointly adsorbing a film material. The smoothing mechanism comprises two smoothing assemblies 31 respectively provided on two sides of the bearing mechanism 10 in the first horizontal direction X. Each smoothing assembly 31 comprises a flexible smoothing piece 313, and the flexible smoothing piece 313 of each of the smoothing assemblies 31 is configured to be inserted in a controlled way into a junction between a side surface a2 and an upper end surface a1 of the cell A and to perform smoothing, thereby preventing the upper end surface a1 of the cell A from being wrinkled under pressure.

Wherein, the mounting seat 224 when driving the mounting seat 224 to descend, is capable of driving the second adsorbing plate 222 to abut against the upper end surface a1 of the cell A. When the second adsorbing plate 222 abuts against the upper end surface a1 of the cell A, the first adsorbing plate 221 and the third adsorbing plate 223 are capable of rotating relative to the mounting seat 224 to respectively abut against side surfaces a2 of the cell A in the first horizontal direction X.

Regarding the above film-coating device, in the actual film-coating operation, the cell A to be coated with a film is located on the bearing mechanism. The driving assembly 21 drives the mounting seat 24 to descend until the mounting seat 224 leads the second adsorbing plate 222 to descend to abut against the upper end surface a1 of the cell A on the bearing mechanism 10, so as to attach the film material adsorbed by the second adsorbing plate 222 to the upper end surface a1 of the cell A. Then, the first adsorbing plate 221 and the third adsorbing plate 223 are controlled to rotate respectively toward two sides of the cell A in the first horizontal direction X and stop after rotated by a certain angle (for example, 30°). At this time, the two flexible smoothing pieces 313 of the smoothing assembly 31 are controlled to insert into the junction between the side surfaces a2 of the cell A in the first horizontal direction X and the upper end surface a1 of the cell A, and smooth the surface of the cell A and the film material, so as to prevent the surface of the cell A and the film material from wrinkling. After smoothing is completed, the flexible smoothing pieces 313 of the two smoothing assemblies 31 are controlled to return to the initial position. And then, the first adsorbing plate 221 and the third adsorbing plate 223 are controlled to continue rotating toward two sides of the cell A in the first horizontal direction X respectively until abutting against two side surfaces of the cell A in the first horizontal direction X respectively, such that the film material adsorbed on the first adsorbing plate 221 and the third adsorbing plate 223 is attached to two side surfaces a2 of the cell A in the first horizontal direction X. Finally, the first adsorbing plate 221, the second adsorbing plate 222, and the third adsorbing plate 223 release the adsorption of the film material, the first adsorbing plate 221 and the third adsorbing plate 223 are rotated in reverse to the initial position (at this time, the film material is separated from the first adsorbing plate 221 and the third adsorbing plate 223, and remains attached to the side surface a2 of the cell A), and the driving assembly 21 drives the mounting seat 224 to ascend and leads the first adsorbing plate 221, the second adsorbing plate 222 and the third adsorbing plate 223 to ascend (at this time, the film material is separated from the second adsorbing plate 222 and remains attached to the upper end surface a1 of the cell A).

In this way, in the film-coating device of the present disclosure, after the film material is applied to the upper end surface a1 of the cell A, two smoothing assemblies 31 of the smoothing mechanism are used to smooth the junction between the side surface a2 and the upper end surface a1 of the cell A (i.e., the junction between the film material and the upper end surface a1 of the cell A). After being smoothed, the first adsorbing plate 221 and the third adsorbing plate

223 are used to coat the two side surfaces a2 of the cell A with a film, so as to prevent the upper end surface a1 of the cell A from wrinkling, which is beneficial to ensuring the quality and film-coating precision of the cell A. Optionally, the film material may be an insulating film, such as a Mylar film.

It should be noted that since the surfaces of the cell A that requires to be coated with a film are the bottom surface and the two side surfaces a2 of the cell A, the cell A may be placed upside down on the bearing mechanism 10, so that the bottom surface of the cell A faces upward, that is, the bottom surface of the cell A is the upper end surface a1 of the cell A. In this way, the bottom surface (i.e., the upper end surface a1) of the cell A is coated with a film by the second adsorbing plate 222. The two side surfaces a2 of the cell A (i.e., the two side surfaces a2 in the first horizontal direction X) are coated with a film by the first adsorbing plate 221 and the third adsorbing plate 223.

Specifically, in an embodiment, the film-adsorbing assembly 22 has a first state and a second state. When the film-adsorbing assembly 22 is in the first state, both the first adsorbing plate 221 and the third adsorbing plate 223 are parallel to the second adsorbing plate 222, and the first adsorbing plate 221, the second adsorbing plate 222 and the third adsorbing plate 223 are all in the same horizontal plane, so that the three adsorb the film material together. When the film-adsorbing assembly 22 is in the second state, one end of each of the first adsorbing plate 221 and the third adsorbing plate 223 distal to the second adsorbing plate 222, is turned toward the bearing mechanism 10 to be perpendicular to the second adsorbing plate 222, such that the first adsorbing plate 221 and the third adsorbing plate 223 are capable of being rotated to abut against the two side surfaces a2 of cell A.

In this way, when the film-coating operation is actually performed, firstly the film-adsorbing assembly 22 is in the first state, so that the first adsorbing plate 221, the second adsorbing plate 222 and the third adsorbing plate 223 adsorb the film material together. Then, under the driving of the driving assembly 21, the first adsorbing plate 221, the second adsorbing plate 222 and the third adsorbing plate 223 to descend along with the mounting seat 224, until the second adsorbing plate 222 abuts against the upper end surface a1 of the cell A. Then, one end of each of the first adsorbing plate 221 and the third adsorbing plate 223 distal to the second adsorbing plate 222 is controlled to rotate toward the bearing mechanism 10 by a certain angle (for example, 30 degrees). Then, the two flexible smoothing pieces 313 are controlled to insert into the junction between the side surface a2 and the upper end surface a1 of the cell A, and the surface of the cell A is smoothed. After smoothing, the two flexible smoothing pieces 313 are controlled to return to the original position. Then, the first adsorbing plate 221 and the third adsorbing plate 223 are controlled to continue to rotate until the film-adsorbing assembly 22 is in the second state. At this time, the first adsorbing plate 221 and the third adsorbing plate 223 abut against the two side surfaces a2 of the cell A in the first horizontal direction X. Then, the first, second and third adsorbing plates 221, 222 and 223 release the adsorption of the film material, such that the film material is applied to the upper end surface a1 and two side surfaces a2 of the cell A. Then, the first adsorbing plate 221 and the third adsorbing plate 223 are controlled to rotate reversely until the film-adsorbing assembly 22 is in the first state. Finally, under the driving of the driving assembly 21, the first adsorbing plate 221, the second adsorbing plate 222 and the third adsorbing plate 223 to ascend to the initial position along with the mounting seat 224, so that the film material may be re-adsorbed to prepare for the next film-coating operation.

Figure 2:
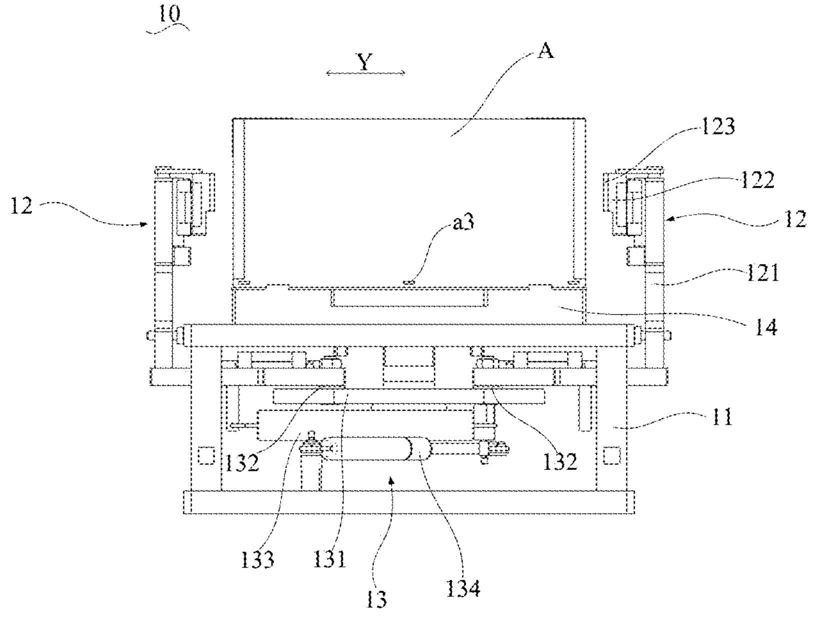
FIG. 2 shows a front view of a bearing mechanism of the film-coating device shown in FIG. 1.
Figure 3:
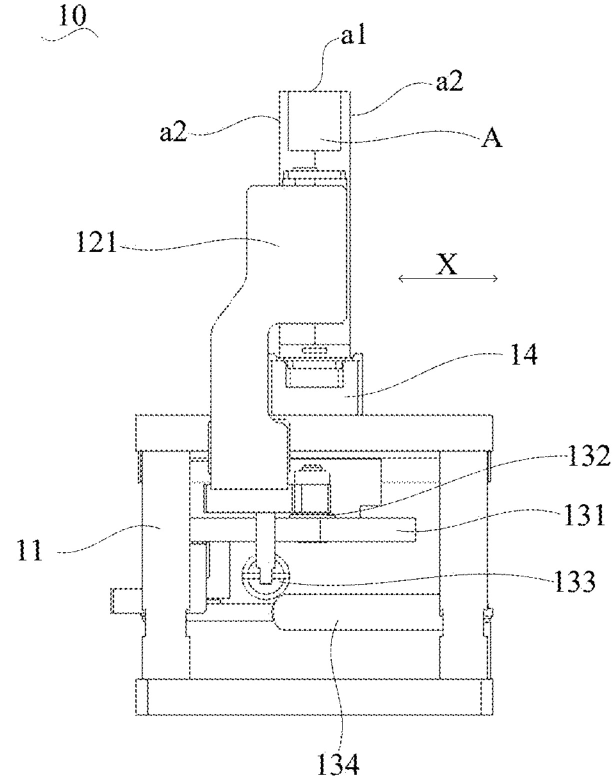
FIG. 3 shows a side view of the bearing mechanism shown in FIG. 2.

Please refer to FIGS. 2 and 3, in embodiments of the present disclosure, the bearing mechanism 10 comprises a bearing frame 11, a positioning base 14 and two clamping assemblies 12. The positioning base 14 is provided on the bearing frame 11 and is used for bearing the cell A. The two clamping assemblies 12 are both provided on the bearing frame 11 and are respectively located on two sides of the positioning base 14 in a second horizontal direction Y perpendicular to the first horizontal direction X. The two clamping assemblies 12 are configured for moving in a controlled way close to or away from each other so as to clamp or release the cell A on the positioning base 14. In this way, the cell A is located and supported by means of the positioning base 14 during film-coating, and the cell A is clamped and fixed in the second horizontal direction Y by means of the two clamping assemblies 12, thereby preventing the cell A from shaking or moving during film-coating.

Specifically, in an embodiment, each clamping assembly 12 comprises a movable plate 121 and a clamping block 122. The movable plate 121 is movably connected onto the bearing frame 11 along the second horizontal direction Y, and the clamping block 122 is provided on the movable plate 121. Alternatively, the movable plate 121 may be connected onto the bearing frame 11 through a guide structure with a slide rail and a slide block, so as to guide the movement of the movable plate 121 relative to the bearing frame 11 by means of the slide rail and the slide block.

The bearing mechanism 10 further comprises a clamping-driving assembly 13 provided on the bearing frame 11, which is in driving connection with two movable plates 121 so as to drive the two movable plates 121 to lead the two clamping blocks 122 to move close to or away from each other along the second horizontal direction Y, thereby clamping or releasing the cell A.

Specifically, in an embodiment, the clamping block 122 may shift in the vertical direction relative to the movable plate 121, so that when the second adsorbing plate 222 to descend to abut against the upper end face a1 of the cell A during film-coating, the clamping block 122 may shift downward along with the cell A, thus preventing the cell A from being scratched due to the relative movement between the clamping block 122 and the cell A.

Further, the two clamping blocks 122 are provided with a flexible layer 123 on the sides facing each other, i.e., the clamping block 122 is in contact with the cell A through the flexible layer 123 thereon, thereby avoiding pinching of the cell A.

Specifically, in an embodiment, the clamping-driving assembly 13 comprises two rollers 132, a cam plate 131, a first elastic member 133 and a second elastic member 134. The two rollers 132 are respectively mounted on two movable plates 121, and the cam plates 131 are rotatably connected onto the bearing frame 11 and are in driving coordination with the two rollers 132. The cam plate 131 has a first position and a second position in the process of rotation relative to the bearing frame 11. When the cam plate 131 is rotated to the first position, the cam plate 131 leads the two movable plates 121 to be close to each other through the two rollers 132, thereby leading the clamping block 122 on the two movable plates 121 to clamp the cell A. When the cam plate 131 is rotated to the second position, the cam plate 131 leads the two movable plates 121 to be away from each other through the two rollers 132, thereby leading the clamping block 122 on the two movable plates 121 to release the cell A.

The two opposite ends of the first elastic pieces 133 are respectively connected to two movable plates 121 to provide an elastic force that causes the two movable plates 121 to have a tendency of moving close to each other. The two opposite ends of the second elastic parts 134 are respectively connected to the cam plate 131 and the bearing frame 11 to provide an elastic force that causes the cam plate 131 to have a rotating tendency from the second position to the first position. In this way, the cam plate 131 may overcome the elastic force of the second elastic piece 134 and rotate from the first position to the second position under the action of external force, so that the two movable plates 121 may overcome the elastic force provided by the first elastic part 133 and lead the two clamping blocks 122 to separate, so as to release the cell A or conveniently place the cell A on the positioning base 14. When the external force disappears, under the action of the second elastic member 134, the cam plate 131 automatically rotates from the second position to the first position, and the two movable plates 121 are close to each other and clamp the cell A under the action of the first elastic member 133. Optionally, the first elastic piece 133 may be a spring. The second elastic piece 134 may be a nitrogen gas spring.

Further, the film-coating device further comprises a conveying line (not shown in Figures). The bearing mechanism 10 is provided on this conveying line to be conveyed by the conveying line, and passes by a material-loading station, a film-coating station and a material-unloading station. In this way, during the actual film-coating operation, firstly, the conveying line conveys the bearing mechanism 10 to the material-loading station, and at this time, the cam plate 131 is rotated from the first position to the second position under the action of external force to separate the two clamping blocks 122, so that the cell A to be coated with a film is inverted on the positioning base 14. The conveying line then conveys the bearing mechanism 10 to the film-coating station, and at this time, the bearing mechanism 10 is located below the second adsorbing plate 222. Moreover, when bearing mechanism 10 leaves the material-loading position, the external force disappears, such that the cam plate 131 is rotated from the second position to the first position, thereby leading the two clamping blocks 122 to clamp the cell A. Then, the cell A is coated with a film by using the film-coating mechanism 20. After the film-coating is completed, the conveying line conveys the bearing mechanism 10 and moves it to the material-unloading station, and at this time, the cam plate 131 is rotated from the first position to the second position under the action of external force, so that the two clamping blocks 122 are separated, so as to facilitate removal of the film-coated cell A.

It should be noted that a force-applying member may be provided at the material-loading station and the material-unloading station, so that when the bearing mechanism 10 moves to the material-loading station or the material-unloading station, the force-applying member is mated with the cam plate 131, thereby driving the cam plate 131 to rotate from the first position to the second position. When the bearing mechanism 10 leaves the material-loading station or the material-unloading station, the force-applying member is separated from the cam plate 131, so that the cam plate 131 automatically rotates from the second position to the first position under the action of the second elastic member 134. Of course, in other embodiments, an external force may also be applied to the cam plate 131 by an operator at his or her discretion, thereby realizing the clamping and opening of the two clamping blocks 122, which is not limited herein.

Figure 4:
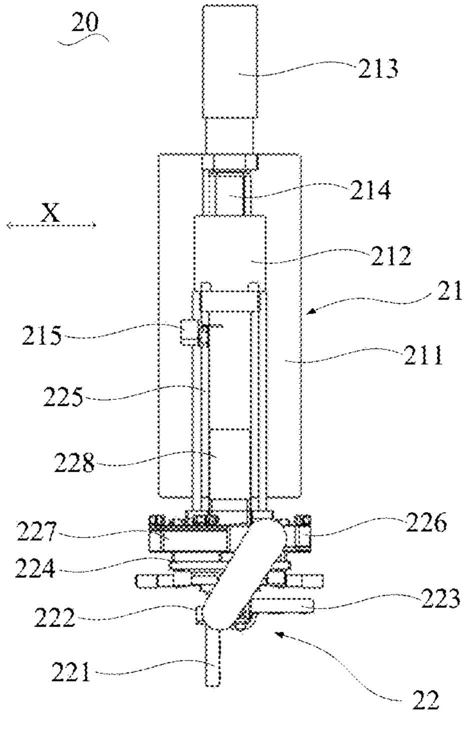
FIG. 4 shows a front view of a film-coating mechanism of the film-coating device shown in FIG. 1.
Figure 5:
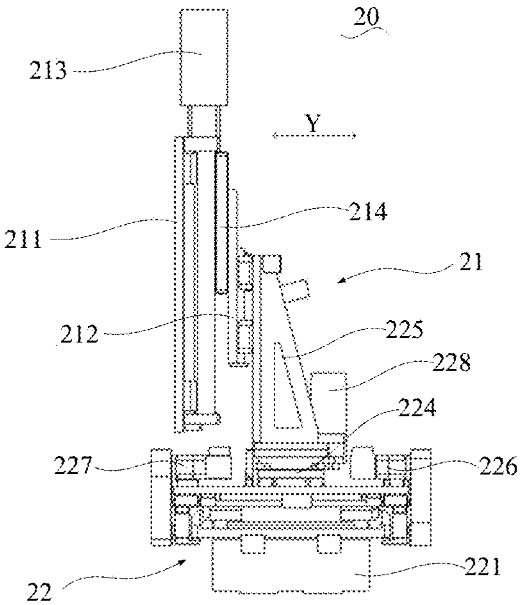
FIG. 5 shows a side view of the film-coating mechanism shown in FIG. 4.

Please refer to FIGS. 4 and 5, in an embodiment of the present disclosure, the film-adsorbing assembly 22 further comprises an elevation seat 225 and a first rotating actuator 228, the elevation seat 225 is connected to a driving end of the driving assembly 21, and the mounting seat 224 is connected onto the elevation seat 225 in a manner that allows it to rotate on a first rotation axis. The first rotating actuator 228 is provided on the elevation seat 225 and is in driving connection with the mounting seat 224, so as to drive the mounting seat 224 to rotate on the first rotating axis. Wherein, the first rotation axis is parallel to the vertical direction.

In this way, the first rotating actuator 228 may drive the mounting seat 224 to rotate, so as to adjust the location of the second adsorbing plate 222, such that the second adsorbing plate 222 is mated with the upper end face a1 of the cell A, so as to facilitate accurate film-coating of the cell A and improve the quality of the film-coating. When it is required to perform film-coating, the first rotating actuator 228 drives the mounting seat 224 to rotate until the second adsorbing plate 222 is mated with the upper end surface a1 of the cell A. The driving assembly 21 then drives the elevation seat 225 to descend, thereby leading the first adsorbing plate 221, the second adsorbing plate 222, and the third adsorbing plate 223 on the mounting seat 224 and mounting seat 224 to descend until the second adsorbing plate 222 abuts against the upper end surface a1 of the cell A. When the film-coating is completed, the driving assembly 21 drives the elevation seat 225 to ascend, thereby driving the first adsorbing plate 221, the second adsorbing plate 222 and the third adsorbing plate 223 on the mounting seat 224 and mounting seat 224 to ascend. Optionally, the first rotating actuator 228 may be a servo motor.

Specifically, in an embodiment, the film-adsorbing assembly 22 further comprises a first rotating shaft and a second rotating actuator 226, the first rotating shaft is rotatably connected onto the mounting seat 224, and one end of the first adsorbing plate 221 proximate to the second adsorbing plate 222 is connected onto the first rotating shaft so as to rotate along with the first rotating shaft. The second rotating actuator 226 is mounted on the mounting seat 224 and is in driving connection with the first rotating shaft so as to drive the first rotating shaft to rotate. Wherein, an axial direction of the first rotating shaft is parallel to a second horizontal direction Y. In this way, the second rotating actuator 226 may drive the first rotating shaft to rotate, so as to lead the first adsorbing plate 221 to rotate relative to the second adsorbing plate 222. Alternatively, the second rotating actuator 226 may be a servo motor. The second rotating actuator 226 may be in driving connection with the first rotating shaft through a belt drive structure.

Specifically, in an embodiment, the film-adsorbing assembly 22 further comprises a second rotating shaft and a third rotating actuator 227, the second rotating shaft is rotatably connected onto the mounting seat 224, and one end of the third adsorbing plate 223 proximate to the second adsorbing plate 222 is connected onto the second rotating shaft so as to rotate along with the second rotating shaft. The third rotating actuator 227 is mounted on the mounting seat 224 and is in driving connection with the second rotating shaft so as to drive the second rotating shaft to rotate. Wherein, an axial direction of the second rotating shaft is parallel to a second horizontal direction Y. In this way, the third rotating actuator 227 may drive the second rotating shaft to rotate, so as to lead the third adsorbing plate 223 to rotate relative to the second adsorbing plate 222. Optionally, the third rotating actuator 227 may be a servo motor. The third rotating actuator 227 may be in driving connection with the second rotating shaft through a belt drive structure.

Specifically, in an embodiment, the driving assembly 21 comprises a supporting plate 211, a connecting seat 212, a first elevation-driving actuator 213 and a second elevation-driving actuator 214. The connecting seat 212 is connected to the supporting plate 211 in a liftable manner, and the first elevation-driving actuator 213 is provided on the supporting plate 211 and is in driving connection with the connecting seat 212 so as to drive the connecting seat 212 to ascend or descend relative to the supporting plate 211. The elevation seat 225 is connected onto the connecting seat 212 in a liftable manner, and the second elevation-driving actuator 214 is provided on the connecting seat 212, and is in driving connection with the elevation seat 225 so as to drive the elevation seat 225 to ascend or descend relative to the connecting seat 212. In this way, the first elevation-driving actuator 213 may drive the connecting seat 212 to ascend or descend so as to lead the elevation seat 225 to ascend or descend together, thereby leading the first adsorbing plate 221, the second adsorbing plate 222 and the third adsorbing plate 223 to ascend or descend. In addition, the second elevation-driving actuator 214 may lead the first adsorbing plate 221, the second adsorbing plate 222 and the third adsorbing plate 223 to ascend or descend by driving the elevation seat 225 to ascend or descend relative to the connecting seat 212.

In actual use, the first adsorbing plate 221, the second adsorbing plate 222, and the third adsorbing plate 223 may ascend or descend quickly for a long distance by means of the first elevation-driving actuator 213, and the first adsorbing plate 221, the second adsorbing plate 222, and the third adsorbing plate 223 ascend or descend slowly for a short distance by means of the second elevation-driving actuator 214. Specifically, when it is required to perform film-coating, firstly, the first elevation-driving actuator 213 is activated, and thus leads the first adsorbing plate 221, the second adsorbing plate 222 and the third adsorbing plate 223 to descend rapidly and not to stop until the second adsorbing plate 222 and the upper end face a1 of the cell A are separated by a small distance (which may be set according to the specific situation, and is not limited herein). Then, the second elevation-driving actuator 214 is activated, and thus leads the first adsorbing plate 221, the second adsorbing plate 222 and the third adsorbing plate 223 to descend slowly and not to stop until the second adsorbing plate 222 is in contact with the upper end surface a1 of the cell A. In this way, by providing a two-stage elevation-driving, on one hand, it is conducive to improving the film-coating efficiency; on the other hand, it is beneficial to avoid the second adsorbing plate 222 from causing a large impact on the cell A and damaging the cell A.

Specifically, in an embodiment, a pressure sensor 215 is provided between the connecting seat 212 and the elevation seat 225, so that the pressure sensor 215 may be used to detect the pressure exerted on the cell A when the second adsorbing plate 222 descends, so as to prevent excessive pressure on the cell A from damaging the cell A.

Specifically, in an embodiment, the connecting seat 212 may be guided to ascend or descend by providing a structure with a slide rail and a slide block between the connecting seat 212 and the supporting plate 211. The elevation seat 225 may also be guided to ascend or descend by providing the structure with a slide rail and a slide block between the elevation seat 225 and the connecting seat 212.

Optionally, the first elevation-driving actuator 213 may be a servo motor, and the first elevation-driving actuator 213 may be in driving connection with the connecting seat 212 through a lead screw pair or a belt drive structure. The second elevation-driving actuator 214 may employ an electric cylinder.

Figure 6:
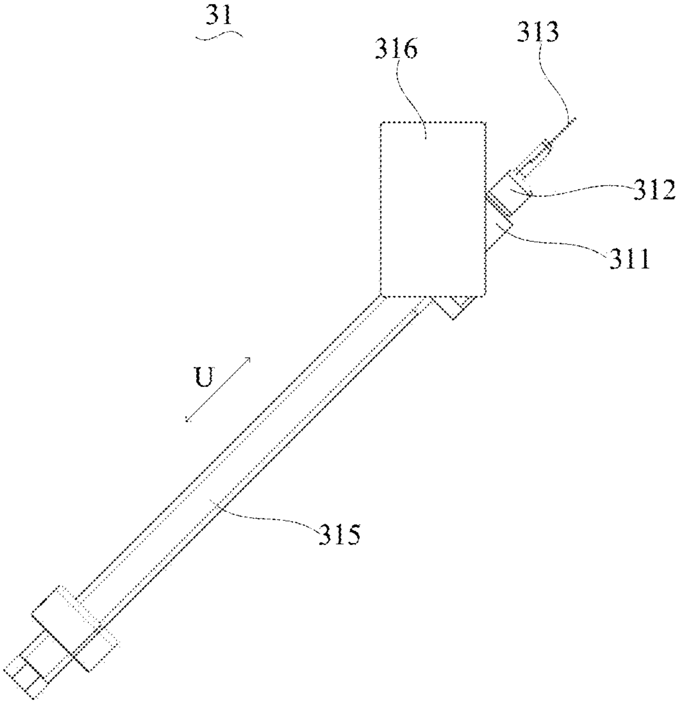
FIG. 6 shows a front view of the smoothing mechanism of the film-coating device shown in FIG. 1.
Figure 7:
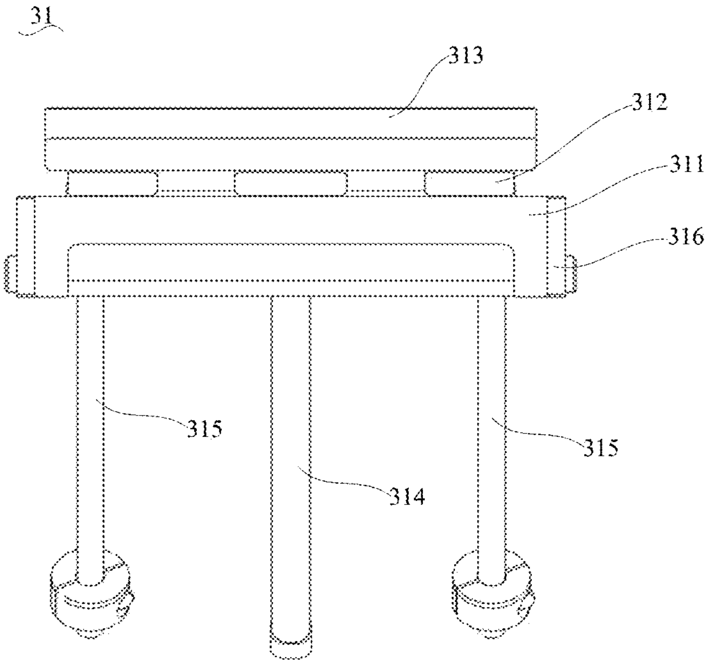
FIG. 7 shows a side view of a smoothing assembly of the smoothing mechanism shown in FIG. 6.
Figure 8:
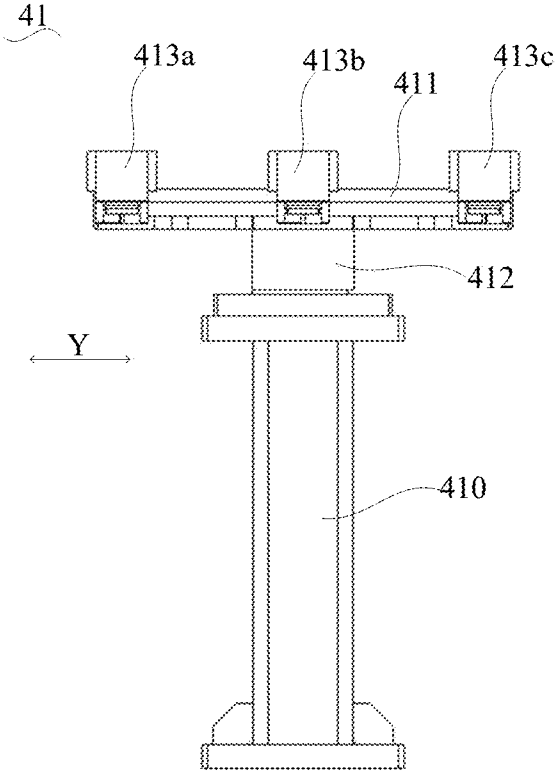
FIG. 8 shows a front view of a welding assembly of a welding mechanism shown in FIG. 1.
Figure 9:
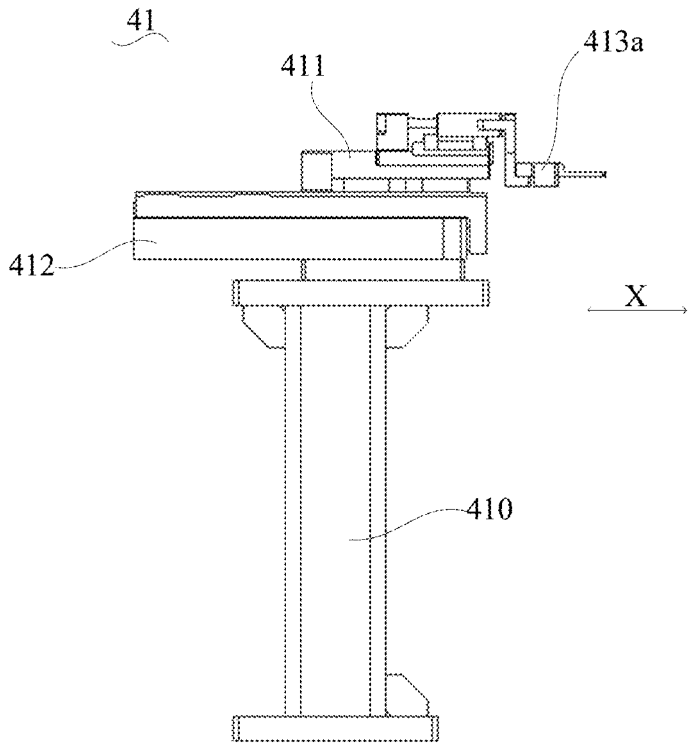
FIG. 9 shows a side view of the welding assembly shown in FIG. 8.
Figure 10:
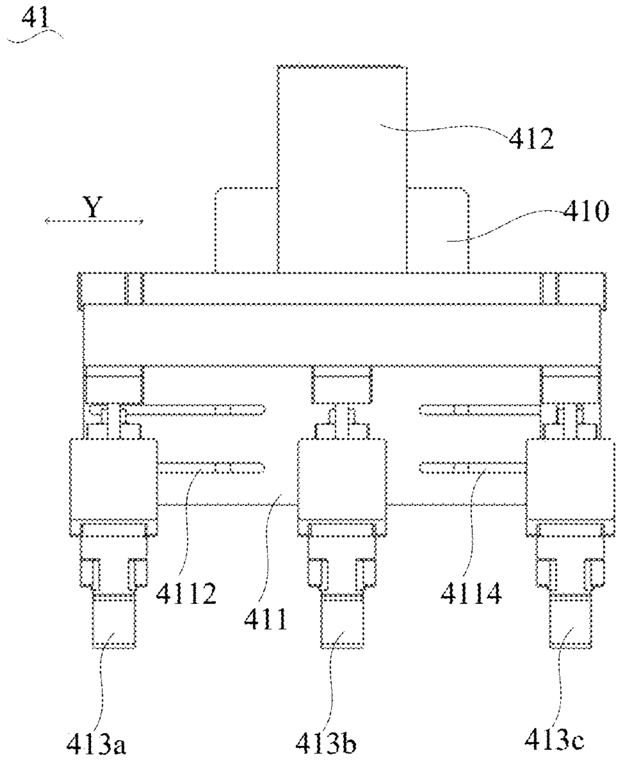
FIG. 10 shows a top view of the welding assembly shown in FIG. 8.

Please refer to FIGS. 1, 6 and 7, the smoothing assembly comprises a fixed seat 311 and a movable seat 312. The movable seat 312 is provided on the fixed seat 311, and the flexible smoothing piece is mounted on the movable seat 312. Wherein, the movable seat 312 is configured to move relative to the fixed seat 311 in a controlled way along a preset direction U, so as to lead the flexible smoothing piece 313 to be inserted into or withdrawn from the junction between the side surface a2 and the upper end surface a1 of the cell A and thus smooth the cell A by means of the flexible smoothing piece 313, thereby preventing the surface of the cell A from wrinkling.

In this way, when it is required to perform smoothing, the movable seat 312 is controlled to move toward the cell A relative to the fixed seat 311 along a preset direction U until the flexible smoothing piece 313 on the movable seat 312 is inserted into the junction between the side surface a2 and the upper end surface a1 of the cell A, so as to smooth the cell A and the prevent the cell A from wrinkling. When smoothing is completed, the movable seat 312 is controlled to move back to the initial position away from the fixed seat 311, causing the flexible smoothing piece 313 on the movable seat 312 to retreat away from cell A.

Specifically, in an embodiment, the above preset direction U intersects with both the first horizontal direction X and the vertical direction. Alternatively, the preset direction U is at 450 to both the first horizontal direction X and the vertical direction.

Specifically, in an embodiment, the smoothing assembly 31 further comprises a smoothing actuator 314, which is mounted on the fixed seat 311 and is in driving connection with the movable seat 312 so as to drive the movable seat 312 to move relative to the fixed seat 311 along the preset direction U. Optionally, the smoothing actuator 314 may be the air cylinder.

Specifically, in an embodiment, smoothing assembly 31 further comprises a guiding shaft 315. One end of the guiding shaft 315 is fixedly connected to the movable seat 312, and the other end thereof is slidably mated with the fixed seat 311, such that the movable seat 312 moves under the guiding effect of the guiding shaft 315, so as to lead the flexible smoothing piece 313 to accurately move to the smoothing position of the cell, thereby ensuring the smoothing of the cell A. It is understandable that the axial direction of the guiding shaft 315 is the above preset direction U.

Please refer to FIGS. 1 and 8 to 10, in an embodiment of the present disclosure, the film-coating device further comprises a welding mechanism (not shown in figures). The welding mechanism comprises two welding assemblies 41 respectively arranged on two sides of the bearing mechanism 10 in the first horizontal direction X. Each welding assembly 41 is configured for welding the film material to the side surface a2 of the cell A. In this way, when the second adsorbing plate 222 abuts against the upper end surface a1 of the cell A, and the first adsorbing plate 221 and the third adsorbing plate 223 are rotated to abut against the two side surfaces a2 of the cell A in the first horizontal direction X, the welding assembly 41 on the same side as the first adsorbing plate 221 will weld the film material on the first adsorbing plate 221 to the side surface a2 of cell A, and the welding assembly 41 on the same side as the third adsorbing plate 223 will weld the film material on the third adsorbing plate 223 to the side surface a2 of the cell A. After the welding is completed, the first adsorbing plate 221, the second adsorbing plate 222, and the third adsorbing plate 223 all release the adsorption of the film material, the first adsorbing plate 221 and the third adsorbing plate 223 are rotated to the above first state, and the driving assembly 21 drives the first adsorbing plate 221, the second adsorbing plate 222, and the third adsorbing plate 223 to ascend. At this time, the film material remains coated on the upper end surface a1 and the two side surfaces a2 of the cell A.

It should be noted that the film-coating device of the present disclosure may complete two processes of film-coating and welding, that is, the film-coating and welding are integrated into one process, which makes the structure of the device compact, saves space, is convenient to operate, has high film-coating precision, and greatly improves production efficiency.

Specifically, in an embodiment, each welding assembly 41 comprises a fixed frame 410, a baseplate 411 and a welding head. The baseplate 411 is provided on the fixed frame 410 and is configured to move relative to the fixed frame 410 in a controlled manner along the first horizontal direction X. The welding head is mounted on the baseplate 411, so as to move along with the baseplate 411 along the first horizontal direction X and thus achieve moving closer to or farther away from the side surface a2 of the cell A. In this way, when welding is required, the baseplate 411 is controlled to lead the welding head to move close to the cell A along the first horizontal direction X until the welding head is in contact with the film material, and the film material is welded to the side surface a2 of the cell A. After welding is completed, the baseplate 411 is controlled to lead the welding head to move away from the cell A along the first horizontal direction X and return to the initial position, so as to avoid the welding head from interfering with the rotation of the first adsorbing plate 221 or the third adsorbing plate 223.

Specifically, in an embodiment, each welding assembly 41 further comprises a welding actuator 412, which is mounted on the fixed frame 410 and is in driving connection with the baseplate 411, so as to drive the baseplate 411 to move in the first horizontal direction X. Optionally, the welding actuator 412 may be the air cylinder.

Specifically, in an embodiment, the guide structure with a slide rail and a slide block may be provided between the baseplate 411 and the fixed frame 410 to guide the movement of the baseplate 411 along the first horizontal direction X.

Specifically, in an embodiment, each welding assembly 41 comprises three welding heads, which are respectively a first welding head 413*a*, a second welding head 413*b* and a third welding head 413*c* arranged at intervals along the second horizontal direction Y. Wherein, positions of the first welding head 413*a* and the third welding head 413*c* relative to the baseplate 411 in the second horizontal direction Y are adjustable. The second welding head 413*b* is fixedly connected to the baseplate 411. In this way, the three welding points a3 (see FIG. 2) on the corresponding side A2 of the cell A are welded by the three welding heads. In addition, by adjusting the positions of the first welding head 413*a* and the third welding head 413*c* along the second horizontal direction Y, it is possible to achieve the purpose of adjusting the spacing between various welding heads, which is beneficial to the application of the cells A of various specifications and improves the compatibility of the device.

Further, the baseplate 411 is opened with a second chute 4114 longitudinally extending along the second horizontal direction Y, and the first welding head 413*a* is provided on the second chute 4114. Each welding assembly 41 further comprises a first fastening member (not shown in figures), which may fasten or release the first welding head 413*a* and the baseplate 411. In this way, when it is necessary to adjust the position of the first welding head 413*a*, the first fastening member is operated to release the first welding head 413*a* and the baseplate 411, such that the first welding head 413*a* is movable along the second chute 4114 so as to adjust the position of the first welding head 413*a* along the second horizontal direction Y. When the position of the first welding head 413*a* is adjusted in place, the first fastening member is operated to fasten the first welding head 413*a* and the baseplate 411, so as to prevent the first welding head 413*a* from moving further. Optionally, the first fastening member may be a fastening screw.

Further, the baseplate 411 is opened with a second chute 4114 longitudinally extending along the second horizontal direction Y, and the third welding head 413*c* is provided on the second chute 4114. Each welding assembly 41 further comprises a second fastening member (not shown in figures), which may fasten or release the third welding head 413*c* and the baseplate 411. In this way, when it is necessary to adjust the position of the third welding head 413*c*, the second fastening member is operated to release the third welding head 413*c* and the baseplate 411, such that the third welding head 413*c* is movable along the second chute 4114 so as to adjust the position of the third welding head 413*c* along the second horizontal direction Y. When the position of the third welding head 413*c* is adjusted in place, the second fastening member is operated to fasten the third welding head 413*c* and the baseplate 411, so as to prevent the third welding head 413*c* from moving further. Optionally, the second fastening member may be the fastening screw.

Please refer to FIGS. 1, 6 and 7, specifically, in an embodiment, the fixed seat 311 is connected to the fixed frame 410 by means of the adjusting plate 316, and the position of the fixed seat 311 relative to the adjusting plate 316 in the vertical direction is adjustable, so as to ensure that the flexible smoothing piece 313 may be accurately inserted to the position where the cell A needs to be smoothed. It should be noted that the position of the fixed seat 311 in the vertical direction may be adjusted by means of a waist-shaped hole and a fastening screw. Of course, other ways may also be used, which is not limited herein.

Of course, it is not limited to adjusting the inserting position of the flexible smoothing piece 313 by adjusting the position of the fixed seat 311 relative to the adjusting plate 316 in the vertical direction. In other embodiments, the inserting position of the flexible smoothing piece 313 may also be adjusted by controlling rotation manner of the fixed seat 311 relative to the adjusting plate 316. Specifically, the fixed seat 311 is rotatably connected to the adjusting plate 316 about an axis parallel to the second horizontal direction Y (for example, the fixed seat 311 is mounted on the adjusting plate 316 by a rotating shaft), and is fastened and fixed on the adjusting plate 316 by a fastening screw. When it is necessary to adjust the insertion position of the flexible smoothing piece 313, releasing the fastening screw and controlling the fixed seat 311 to rotate relative to the adjusting plate 316. When the fixed seat 311 is rotated in place, the fixed seat 311 and the adjusting plate 316 are fastened by means of the fastening screw, so as to prevent the fixed seat 311 from rotating continuously.

The technical features of the above embodiments can be combined arbitrarily. In order to simplify the description, all possible combinations of the technical features in the above embodiments are not described. However, as long as there is no contradiction in the combination of these technical features, it should be considered as a scope of this description.

The above embodiments only express several embodiments of the present application, and the description is more specific and detailed, but it cannot be understood as a limitation on the scope of the present application. It should be noted that for those skilled in the art, several modifications and improvements can be made without departing from a concept of the present application, which belong to a protective scope of the present application. Therefore, the protective scope of the present application shall be subject to the appended claims.

The invention claimed is:

1. A film-coating device, comprising:

a bearing mechanism configured for bearing a product to be coated with a film;

a film-coating mechanism comprising a driving assembly and a film-adsorbing assembly, the film-adsorbing assembly comprising a mounting seat, a first adsorbing plate, a second adsorbing plate and a third adsorbing plate; wherein the mounting seat is mounted on a driving end of the driving assembly and is located above the bearing mechanism; the first adsorbing plate, the second adsorbing plate and the third adsorbing plate are provided in sequence along a first horizontal direction on one side of the mounting seat facing toward the bearing mechanism, and are configured for jointly adsorbing a film material; and a smoothing mechanism comprising two smoothing assemblies respectively provided on two sides of the bearing mechanism in the first horizontal direction, each of the smoothing assemblies comprising a flexible smoothing piece, and the flexible smoothing piece of each of the smoothing assemblies being configured to be controllably inserted into a junction between a side surface and an upper end surface of the product and to perform smoothing;

wherein the driving assembly is configured for driving the mounting seat to ascend and descend, and the mounting seat is configured for driving the second adsorbing plate to abut against the upper end surface of the product in the process of descending; when the second adsorbing plate abuts against the upper end surface of the product, the first adsorbing plate and the third adsorbing plate are configured for rotating relative to the mounting seat to respectively abut against side surfaces of the product in the first horizontal direction.

2. The film-coating device according to claim 1, wherein the film-adsorbing assembly has a first state and a second state;

when the film-adsorbing assembly is in the first state, both the first adsorbing plate and the third adsorbing plate are parallel to the second adsorbing plate, and the first adsorbing plate, the second adsorbing plate and the third adsorbing plate are in the same horizontal plane; and when the film-adsorbing assembly is in the second state, one end of each of the first adsorbing plate and the third adsorbing plate distal to the second adsorbing plate, is turned toward the bearing mechanism to be perpendicular to the second adsorbing plate.

3. The film-coating device according to claim 1, wherein the bearing mechanism comprises a bearing frame, a positioning base and two clamping assemblies;

the positioning base is provided on the bearing frame and is configured for bearing the product; the two clamping assemblies are both provided on the bearing frame and are respectively located on two sides of the positioning base in a second horizontal direction perpendicular to the first horizontal direction; the two clamping assemblies are configured for moving in a controlled way close to or away from each other so as to clamp or release the product.

4. The film-coating device according to claim 1, wherein the film-adsorbing assembly further comprises an elevation seat and a first rotating actuator, the elevation seat is connected to a driving end of the driving assembly, the mounting seat is connected onto the elevation seat to provide for rotation thereof on a first rotation axis, and the first rotating actuator is provided on the elevation seat and is in driving connection with the mounting seat;

wherein the first rotation axis is parallel to a vertical direction.

5. The film-coating device according to claim 1, wherein the film-adsorbing assembly further comprises a first rotating shaft and a second rotating actuator, the first rotating shaft is rotatably connected onto the mounting seat, and the second rotating actuator is provided on the mounting seat and is in driving connection with the first rotating shaft;

one end of the first adsorbing plate proximate to the second adsorbing plate is connected onto the first rotating shaft, an axial direction of the first rotating shaft is parallel to a second horizontal direction, and the second horizontal direction is perpendicular to the first horizontal direction.

6. The film-coating device according to claim 1, wherein the film-adsorbing assembly further comprises a second rotating shaft and a third rotating actuator, the second rotating shaft is rotatably connected onto the mounting seat, and the third rotating actuator is provided on the mounting seat and is in driving connection with the second rotating shaft;

one end of the third adsorbing plate proximate to the second adsorbing plate is connected onto the second rotating shaft, an axial direction of the second rotating shaft is parallel to a second horizontal direction, and the second horizontal direction is perpendicular to the first horizontal direction.

7. The film-coating device according to claim 1, wherein each smoothing assembly comprises a fixed seat and a movable seat, the movable seat is provided on the fixed seat, and the flexible smoothing piece is mounted on the movable seat;

wherein the movable seat is configured to controllably move relative to the fixed seat along a preset direction, so as to lead the flexible smoothing piece to be inserted into or withdrawn from the junction between the side surface and the upper end surface of the product.

8. The film-coating device according to claim 7, wherein the preset direction intersects with the first horizontal direction and a vertical direction.

9. The film-coating device according to claim 1, wherein the film-coating device further comprises a welding mechanism, the welding mechanism comprises two welding assemblies respectively arranged on two sides of the bearing mechanism in the first horizontal direction, and each welding assembly is configured for welding the film material to the side surface of the product.

10. The film-coating device according to claim 9, wherein each welding assembly comprises a fixed frame, a baseplate and a welding head, the baseplate is provided on the fixed frame and is configured to move relative to the fixed frame in a controlled manner along the first horizontal direction, and the welding head is mounted on the baseplate.

11. The film-coating device according to claim 9, wherein each welding assembly comprises three welding heads, which are respectively a first welding head, a second welding head and a third welding head arranged at intervals along a second horizontal direction perpendicular to the first horizontal direction;

wherein the first welding head and the third welding head are adjustable in their positions relative to a baseplate in the second horizontal direction.

* * * * *